Oct. 13, 1970 — M. H. BOCQUET ET AL — 3,533,865
METHOD FOR CONTINUOUS WELDING OF PLASTICS SHEETS, IN PARTICULAR FOR USE IN THE MANUFACTURE OF EXPLORATORY BALLOONS
Filed March 28, 1967
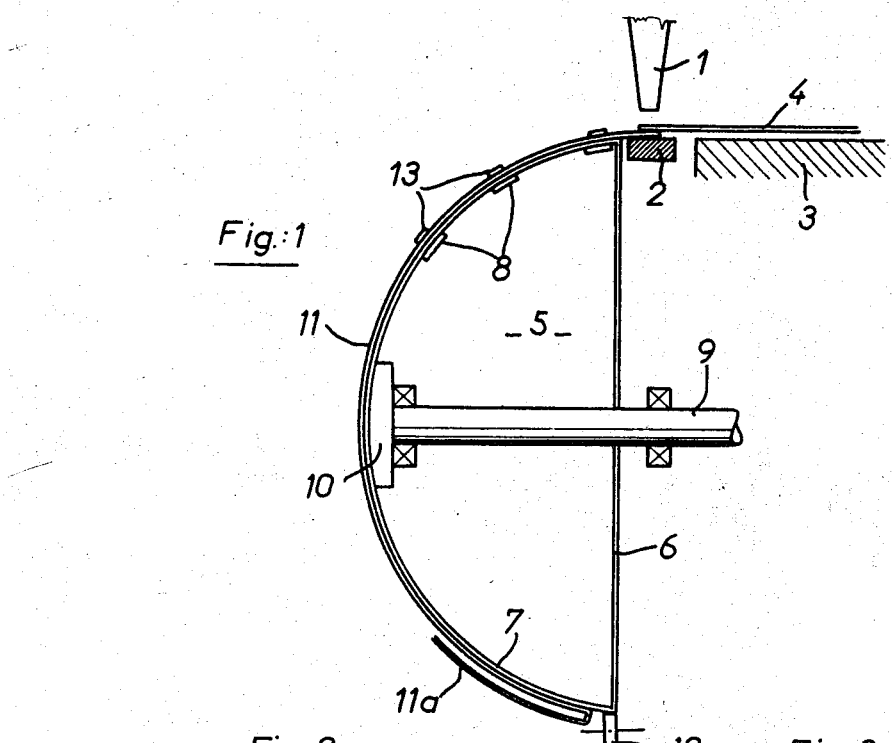
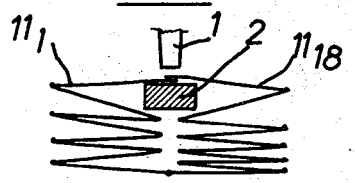
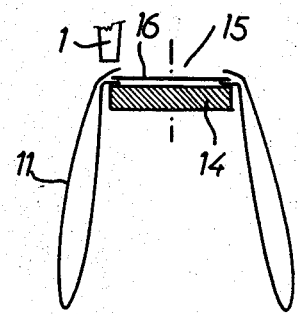
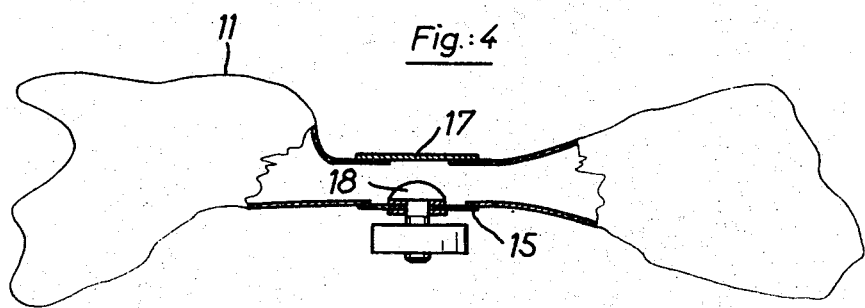

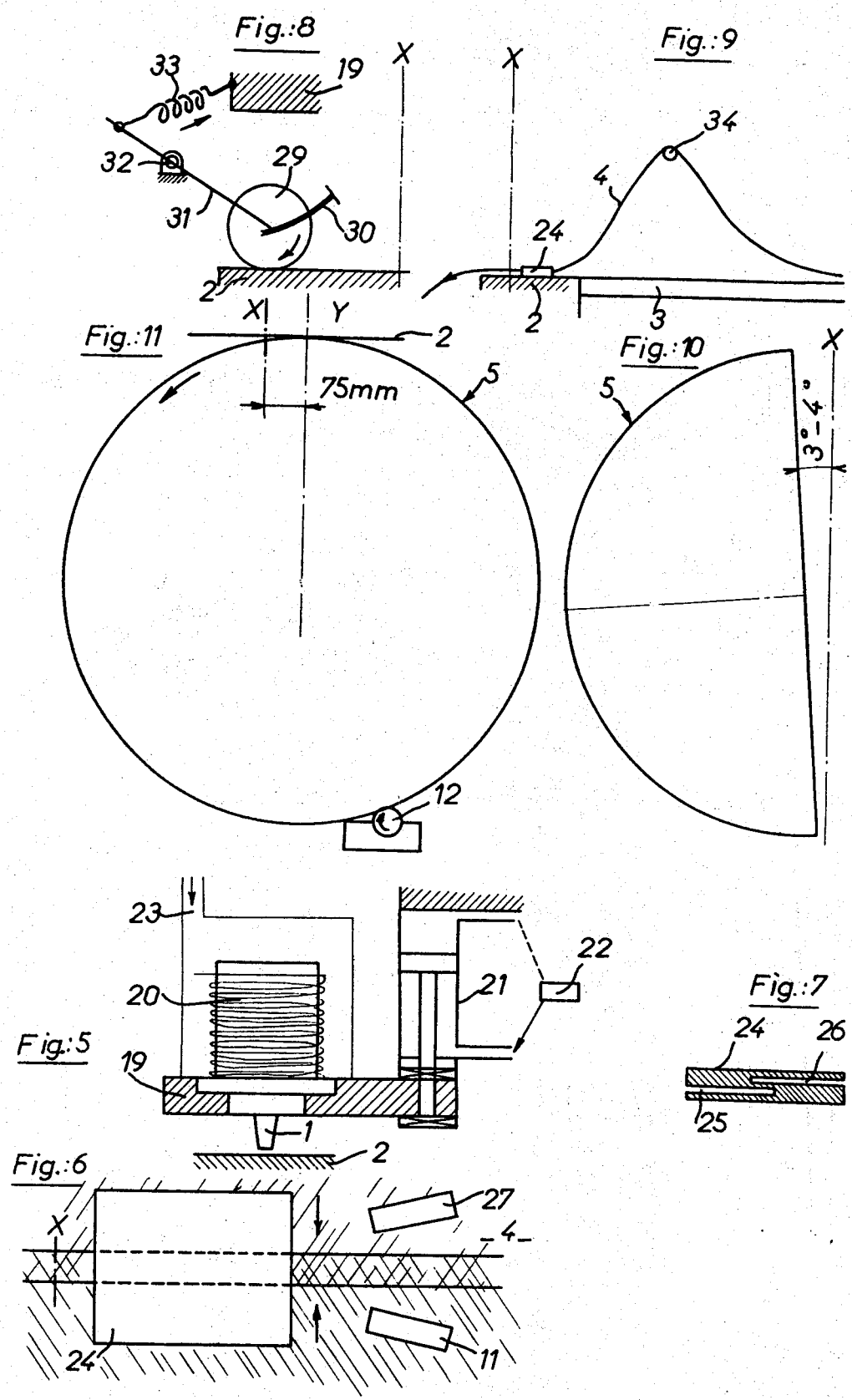

United States Patent Office 3,533,865
Patented Oct. 13, 1970

3,533,865
METHOD FOR CONTINUOUS WELDING OF PLASTICS SHEETS, IN PARTICULAR FOR USE IN THE MANUFACTURE OF EXPLORATORY BALLOONS
Maurice Henri Bocquet, Massy, and Michel Chatain, Bourg-la-Reine, France, assignors to Centre National d'Etudes Spatiales, Paris, France, a French company
Filed Mar. 28, 1967, Ser. No. 626,595
Claims priority, application France, Apr. 8, 1966, 57,133
Int. Cl. B32b 31/16
U.S. Cl. 156—73
3 Claims

ABSTRACT OF THE DISCLOSURE

A stratospheric balloon or the like made of very thin sheets of polyethylene-terephthalate or other plastics material, previously cut to form gores. Two gores are placed edge to edge, with a slight overlap, and are welded together ultrasonically in continuous fashion, whereafter the assembly is shifted sideways and a fresh process of continuous welding is effected using another gore placed along a free edge of said assembly, the process being repeated until the free edges of the first and last gores are welded together.

---

The present invention relates to a method and apparatus for continuous welding of plastics sheets and, in particular, to a method and apparatus by means of which it is possible to effect continuous welding of very thin sheets of plastics material such as polyethyleneterephthalate, which is suitable for the manufacture of stratospheric exploratiory balloons.

In accordance with the present invention, after the sheets of plastics material have been cut to form gores, two of the latter are placed edge to edge, slightly overlapping, and they are welded together ultrasonically in continuous fashion, along what will ultimately form a meridian of the balloon, whereafter the assembly thus formed is shifted sideways and a fresh process of continuous welding is effected using another gore placed along the free edge of the said assembly, the process being repeated until the free edges of the first and last gores are welded together.

The balloon in this state, not yet provided with its polar cap portions, may be now completed by welding two caps (of the same material as the gores) in place along parallel lines, the caps slightly overlapping the terminal edges of the welded gores and the welding process once again being a continuous one using ultrasonic techniques.

The present invention also relates to stratospheric balloons produced by continuous welding of very thin sheets of plastics material, and also to the apparatus employed for implementing the above-described process.

Some practical embodiments of the invention will now be described by way of example with reference to the accompanying drawings, in which:

FIG. 1 is a schematic elevation of part of an installation for carrying out the method in accordance with the invention.

FIGS. 2, 3 and 4 are diagrams respectively illustrating the method of welding at different stages.

FIG. 5 is a schematic vertical section through a welding head.

FIG. 6 is a plan view of a detail.

FIG. 7 is a transverse section.

FIGS. 8 and 9 illustrate other embodiments.

FIGS. 10 and 11 illustrate related frontal and profile elevations respectively.

FIG. 1 illustrates the tip of an ultrasonic welding electrode 1, which is situated directly above an anvil portion 2, the latter being level with a feed table 3 across which the sheet 4 of material to be welded is fed.

In the vicinity of the anvil 2 there is located a hemispherical support 5, constituted by a vertical disc 6 from which there extend semicircular arcuate pieces 7 equipped with magnets 8. The support 5 is rotatable about a horizontal shaft 9.

In one embodiment of the invention, for manufacture of a balloon, the support 5 is so designed and arranged that the plane 6 parallel to the equator of the hemispherical portion is located at 45 millimetres from the axis of the welding head. The diameter of the support in this example is 1.96 metres and corresponds to the diameter of a circle inscribed in an eighteen-sided polygon, the latter itself inscribed in a 2 metre diameter circle. Thus, the support 5 is constituted by eighteen rigid arcuate pieces 7 along which there are attached a large number of magnets 8. At the polar level, the arcuate pieces 7 are linked to a solid cap portion 10, 0.41 metre in diameter, which is designed to locate and assist in the welding of the cap portions of the balloon.

The support 5 serves to locate a gore which is to be welded, and hold already welded gores in position due to the provision of metal elements 13 situated opposite the magnets 8 and at the same arcuate spacing thereas.

In order to carry out a welding operation (in a direction parallel to the plane of FIG. 1), on the one hand a strip of the sheet material 4, previously cut to the form of the gore, and on the other hand a similar sheet 11, are placed edge to edge, the edges overlapping one another, for example by 7 millimetres, above the anvil 2 and beneath the welding electrode 1. Once the welding head has been set in operation, it is then only necessary to transport the material at an adequate linear velocity, for example of 1.3 centimetres per second but if desired as much as 3 or even 5 centimetres per second, by rotating the hemispherical support 5 through the medium of a motor-driven roller 12 bearing against its periphery, the speed of which roller can be regulated.

After each longitudinal welding phase, the assembly of already welded gores 11 are shifted sideways on the hemispherical support 5, making sure that the last gore shifts by an appropriate width.

The assembly of welded gores is thus freshly located by the hemispherical support 5 and welding between two gores, the last one welded to the assembly and now located the support 5 and the other laid flat on the feed table 3, is then carried out again.

From the eight welded gore onwards, the hemisphere 5 is still used as a support but it then becomes necessary to fold the welded gores in the manner illustrated at 11a. The effect of the magnets 8 in holding two thicknesses of plastics material sheet is highly satisfactory.

The last longitudinal welding operation is carried out flat, this being the stage at which the first gore $11_1$ and the last gore $11_{18}$ are welded together, considering the example of a balloon having 18 gores. In order to carry out this operation, the assembly of gores is folded in the manner of a concertina along the weld lines between neighboring gores, eight gores being folded at one side and ten at the other (see FIG. 2). The next operation is then to weld together two gores on the anvil 2.

The major part of the balloon now being completed, all that remains is to position the two polar caps and weld them in place.

For welding the first cap (FIG. 3) in place, a circular rotating anvil 14 is employed both when sticking and when welding, the hole 15 corresponding to the second cap, providing for passage to the electrode 1. This approach has the advantage of reducing to a minimum the diameter of the first cap 16, but means that the second one has to have a slightly larger diameter.

Difficulties of locating the welded assembly and the care needed to avoid creases at the weld site, have lead to the custom of pre-shaping the caps by extrusion and of employing a hemispherical support equipped with a spherical cap portion 10 of diameter slightly greater than the diameter of the cap of material which is being welded in place.

The locating of the welded elements now having been effected on the hemispherical support 5, the sticking in place of the second cap 17 (see FIG. 4) only presents any problem insofar as it is necessary to prevent the formation of creases, which can give rise to considerable leakage losses when the balloon is under pressure. With the aim of achieving a better seal in the case of this latter cap, and in order to achieve uniform manufacture, the welding in place of this cap is executed using, as an anvil inside the balloon, the metal part of a valve 18.

It should be pointed out that this use of a welding anvil such as 18 inside a continuous envelope such as the envelope 11, is of general application and may be useful in solving other problems concerned with closing off envelope structures.

The welding head illustrated in FIG. 5 comprises, basically:

a support 19;
a magnetostrictive arrangement 20 integral with the support 19
an electrode 1 the tip of which is made of aluminium;
a double-acting pneumatic ram 21, controlled by a solenoid valve 22, which ram acts directly on the support 19 and makes it possible on the one hand rapidly to disenegage the electrode 1, whilst on the other hand it makes sure that a constant and controllable pressure is maintained between electrode 1 and anvil 2 independently of variations in thickness of the films of plastics material being welded together;
an air-cooling circuit 23, for the electrode 1 and the magnetostrictive assembly 20.

The anvil 2, which is flat and substantially aligned with the electrode 1, is preceded by a guide device designed in the manner hereinafter described with reference to FIGS. 6 and 7. The device, located about 10 millimetres in front of the axis X of the welding head, is constituted by a parallelepiped block 24 in which there are formed, at two levels, flat, thin grooves 2 5and 26 which open out at the exterior into the opposite flanks of the block 24 and are sufficiently deep partially to overlap one another for example by 7 millimetres.

Under the effect of two rollers 27 and 28 arranged in converging planes, the strip 4 of material on the one hand and the last gore 11 of the welded assembly on the other hand are fed together and registered in the respective grooves 25 and 26, abutting the bases thereof, such that the free edges of such gores 4 and 11 are overlapped to the prescribed extent.

It has been experienced that in cold weather, the increased stiffness of the sheet material interferes to a certain extent with correct positioning. This difficulty is overcome by providing heater elements, for example of infrared kind, in front of the guide device 24.

The longitudinal feed of the material during the course of welding is effected with the air of a rubber drive roller 29 (FIG. 8) which is itself driven through a flexible drive 30 and bears against the anvil 2, pressing together the overlapping welded edges at a point downstream of the axis X of the welding head. This roller 29 is mounted at the tip of a lever 31, pivoted at 32, upon which lever acts a spring 33 fixed to the support 19.

The purpose of this driven roller 29 is to facilitate the transportation of the gores as they are assembled, but in particular also to maintain a constant tension in the welded gore sections in the interval between the electrode 1 and the end of the anvil 2.

FIG. 9 illustrates the feed table 3, disposed horizontally at the level of the anvil 2, the end of such table being slightly upstream of the axis X of the welding head. Before being introduced into the guide device 24, the strip of material 4 is lifted over a rotating shaft 34 so as to enter the said device from above.

The automatic registering in the guide 24 of the gore 11 carried by the hemispherical support 5 appears to be influenced by the relative positions of the diametrical plane of the support 5 and the vertical plane X passing through the welding head (see FIG. 10). An angle of 3 to 4° produces the best results.

On the other hand (see FIG. 11) an offset of 75 millimetres between the welding axis X and the vertical plane Y, passing through the axis of the sphere 5, facilitates the registering of the gores.

Slight variations in these different relative positions can reduce the stability of the guide system.

In this same context, the use of a spherical anvil, whose axis of symmetry is offset in relation to the electrode axis, introduces a horizontal component which can be used to shift the material.

What is claimed is:
1. A method for producing an envelope structure of the balloon type comprising:
    precutting thermoplastic sheets into the shape of gores, placing one of said gores over a hemispherical support structure and the other gore on an adjacent flat support, each of said gores having an edge in overlapping relationship with the other gore, continuously ultrasonically welding said gores at the overlapping edge by rotating a said hemispherical support in the direction of an operating ultrasonic welder, shifting the welded assembly sideways over said support thereby enabling another precut gore to be positioned in overlapping relationship along the free edge of said first assembly, continuously feeding and ultrasonically welding the overlapping edges as in the first assembly, repeating the feeding and continuous welding until the free edge of the first assembly and the free edge of the last assembly are welded.
2. A method in accordance with claim 1 wherein said rotatable hemispherical support is frictionally driven by a roller engaging the periphery of said support at a predetermined and closely regulated speed.
3. A method in accordance with claim 2 wherein the further step of continuously ultrasonically welding thermoplastic cap members along the terminal edges of the welded gores is carried out.

References Cited

UNITED STATES PATENTS

| | | | |
|---|---|---|---|
| 2,703,769 | 3/1955 | Stinger | 244—31 X |
| 2,758,804 | 8/1956 | Hakomaki | 244—31 |
| 2,919,082 | 12/1959 | Winzen | 244—31 |
| 3,109,611 | 11/1963 | Yost | 244—31 |
| 3,182,932 | 5/1965 | Winker | 244—31 |
| 3,419,447 | 12/1968 | Hewitt | 156—73 |

CARD D. QUARFORTH, Primary Examiner

A. J. STEINER, Assistant Examiner

U.S. Cl. X.R.

29—470, 3; 244—31